Patented Jan. 12, 1937

2,067,729

UNITED STATES PATENT OFFICE 2,067,729

PROCESS FOR THE DECOMPOSITION OF HYDROCARBONS AND CATALYST THEREFOR

Frank Porter, Syracuse, N. Y., assignor to Atmospheric Nitrogen Corporation, New York, N. Y., a corporation of New York No Drawing. Application July 16, 1931, Serial No. 551,299

7 Claims. (Cl. 23—212)

This invention relates to the catalytic decomposition of hydrocarbons and in particular to a process of promoting the reaction of a hydrocarbon and water vapor and to a catalyst for such a reaction which has a relatively high resistance to sulfur poisoning.

Heretofore the production of gases containing hydrogen and of mixtures of hydrogen and oxides of carbon by the decomposition of hydrocarbons has been effected by contacting a mixture of hydrocarbon and steam with certain metals, such as iron and nickel. The use of these metals as catalysts for the treatment of gases containing sulfur and sulfur compounds is disadvantageous because of the tendency of the catalyst to become inactive due to poisoning produced by the presence in the reacting gases of the sulfur and sulfur compounds. In order to operate the catalyst efficiently and achieve thereby a high conversion, it has been necessary to select those hydrocarbon mixtures which are free of sulfur compounds or to provide means for removing these compounds from the hydrocarbon prior to its use. Due to the expense involved in removing such poisons from gases, many natural occurring gases containing substantial quantities of hydrocarbons have not been satisfactory for use in the catalytic production of hydrogen. A further disadvantage, in the use of catalytic masses which are susceptible to material poisoning by the presence of sulfur compounds in gases, is that such catalysts after poisoning require regeneration and are then usually not as active as before such poisoning.

It is an object of the present invention to provide a catalyst active in promoting the reaction of a hydrocarbon and water vapor. It is a further object of this invention to provide a process for the preparation of substantial quantities of a gas containing hydrogen, such as a mixture of hydrogen and oxides of carbon, by the catalytic treatment of a mixture of a hydrocarbon and water vapor with a catalyst. Another object of this invention is to prepare a catalyst which is relatively insensitive to sulfur poisoning and to provide a process for the catalysis of a gas containing a hydrocarbon and water vapor contaminated with sulfur impurities whereby hydrogen may be produced therefrom.

My invention comprises a catalyst for the decomposition of hydrocarbons containing one or more of the following substances: chromium, vanadium, tungsten, uranium and molybdenum, with or without other materials which serve to promote the activity of the catalyst. My invention further comprises a process for the decomposition of hydrocarbon gases containing sulfur impurities employing the aforesaid catalyst as a contact material to promote the decomposition reaction. My invention comprises, further, processes for the production of the said catalysts.

In its preferred embodiment, my invention comprises a catalyst for and a process of decomposing a hydrocarbon gas, such as natural gas which consists principally of methane, gas obtained by the distillation of bituminous coal, coal gas or water gas made from bituminous coal and steam, which gases may contain sulfur impurities in amount above about 1 part in 20 million, wherein the hydrocarbon gas is mixed with steam and the mixture is then heated to a high temperature and brought into contact with a catalyst comprising one or more of the above substances and in particular chromium. While I do not wish to be bound by any particular explanation or theory as to why the above catalysts are effective in accordance with the present invention, it is my thought that their effectiveness is due in part at least to the easily decomposable character of their sulfides. It will be noted that the elements in question all fall within the fifth and sixth groups of the periodic system.

In accordance with my invention, therefore, decomposition of gaseous hydrocarbons may be effected by passing a gaseous mixture comprising a hydrocarbon and water vapor over a catalyst comprising chromium at an elevated temperature. I have found that the presence in the reaction mixture of sulfur and sulfur compounds in amount which exercises a marked deleterious effect upon, for example, a nickel catalyst, does not materially affect the activity of my new and improved catalyst. Thus it is possible by employing this catalyst to utilize for the catalytic production of hydrogen many natural gases and industrial gases, such as gas obtained by the distillation of bituminous coal, etc., containing sulfur impurities.

A catalyst of my invention may contain a compound of chromium such as an oxide of chromium. The activity of the catalyst in promoting the decomposition of hydrocarbons may be accelerated by mixing the compound of chromium with a substance which acts as a promoter. My preferred composition consists of a catalytic mass, the major catalytic ingredient of which is oxide of chromium in conjunction with a relatively minor proportion of a promoter. If desired, my catalyst may be supported on a suitable carrier, a constituent of which may constitute a promoter for the catalyst.

For a better understanding of the invention, reference should be had to the following examples showing methods of preparing catalysts and novel catalysts comprised in the scope of this invention.

Example I.—A compound of chromium which has the property of decomposing under the influence of high temperatures to give an oxide of chromium is heated to decompose it. For example, I take an ammonium salt of chromium, such as ammonium dichromate $(NH_4)_2Cr_2O_7$, and heat it slowly to drive off water and then strongly to 300° C. or higher until it is substantially completely decomposed to the oxide. The resulting material is then made into pellets by tabletting under pressure.

Example II.—In the preparation of a composite catalyst according to my invention, it is preferable to select a salt of the promoting element which will decompose on being heated to a high temperature to give an oxide of the element as in the case of ammonium dichromate. For example, a catalyst comprising about 90% chromium oxide and 10% molybdenum oxide may be made as follows: mix 74 g. of pure crystalline ammonium dichromate and 6.8 g. of ammonium molybdate and add to the mixture 100 cc. of distilled water. The resulting mixture is heated slowly until substantially all the water is driven off and then to 300° C. or higher until the salts are substantially completely decomposed to the oxides. The dry material substantially consisting of chromium oxide and molybdenum oxide is then made into pellets by tabletting under pressure.

It is apparent that without transcending the scope of my invention, I may employ in the above examples instead of ammonium dichromate any salt of chromium which under the influence of temperature gives rise to chromium oxide, and likewise, instead of using in Example II the ammonium salt of the promoting element, I may employ any salt thereof which, under the influence of high temperature, gives rise to the oxide. If desired, the salts may first be dissolved in water and after stirring the water may be evaporated off and the dry residue then heated to a high temperature to produce the oxides.

The catalysts described above and prepared according to my invention may be used in any of the known conversion systems for the decomposition of hydrocarbons. The catalyst prepared as described above may be charged directly or after a preliminary treatment by heating in contact with a reducing gas such as hydrogen, into a catalyst container and a hydrocarbon gas such as methane, containing sulfur impurities, is mixed with steam and passed in contact with the catalyst at an elevated temperature. Hydrocarbon and steam in the gas react to produce hydrogen and oxides of carbon.

A suitable temperature range for the operation of the catalyst of my invention may comprise the range from 500° to 900° C. but it is preferred to operate at a temperature between 700° and 900° C. A mixture of natural gas and steam may be preheated to a temperature within the range of efficient operation of the catalyst, for example, to a temperature of about 800° C. and then passed in direct contact with the catalyst. If desired, the gaseous products leaving the catalyst may be again heated and passed in contact with a second catalytic mass for further treatment. I have found that my catalyst may be operated under the conditions above stated for long periods of time without the activity of the contact mass substantially decreasing.

An important advantage of this invention lies in the fact that a catalyst comprising a compound of chromium substantially as described is relatively little affected by the presence of sulfur compounds in the reaction gases. For example, it has been found that a mixture of methane and steam containing as much as 1% of sulfur compounds, calculated as hydrogen sulfide, may be passed in contact with the catalyst of this invention without causing an excessive decrease of the activity of the catalyst. The catalyst is thus particularly adapted for use in treating natural gas or coke oven gas containing of the order of 0.1–1.0% sulfur compounds. A further advantage of my invention lies in the fact that the catalyst herein disclosed may be exposed to air at high temperatures without effecting a substantial decrease in the activity of the catalyst.

Since the preparation of catalysts other than a chromium catalyst involves changes and modifications in the particular processes described above under Examples I and II, it is intended that all matter contained in the above description shall be interpreted as illustrative and not in a limiting sense. For example, catalysts comprising vanadium, tungsten, uranium and molybdenum may be prepared in a manner similar to that indicated for chromium. Further, instead of using molybdenum oxide as a promoter for my chromium catalyst, I may employ an oxide of one of the other elements above mentioned by using in Example II a compound of an element from this group which, when heated to an elevated temperature, gives rise to the oxide. The temperature which must be employed to convert the ammonium compound to the metal oxide will, of course, vary with the ammonium compounds of different elements, and it is apparent that under these circumstances an appropriate change in the temperature to which the materials are heated may be made.

In the appended claims, the expression "major catalytic constituent" is intended to designate that constituent which constitutes the major proportion by weight of the catalytically active constituents of the total mass, as distinguished from promoters which may of themselves be a catalyst for the reaction, but which constitute a minor proportion of the catalytically active constituents. It is apparent, of course, that carriers may be incorporated with the catalytic material in such proportions that the carrier may itself constitute the major proportion of the total contact mass.

I claim:

1. A catalyst for promoting the reaction between a hydrocarbon and steam comprising chromium oxide and an oxide of molybdenum and containing substantially no nickel, iron or cobalt.

2. A process for producing a catalyst for promoting the reaction between a hydrocarbon and water vapor which comprises mixing water and the ammonium compounds of a plurality of metallic elements from the group consisting of chromium, vanadium, tungsten, uranium and molybdenum, freeing the mixture of water and heating the dry mixture to that temperature at which the metallic elements in said compounds are converted to the oxide.

3. A process for the catalytic decomposition of hydrocarbons which comprises reacting a mixture of methane and steam at a temperature between about 500° C. and 900° C. in the presence of a catalyst containing the product resulting from heating a mixture of ammonium dichromate and ammonium molybdate to a temperature not substantially below 300° C.

4. A process for the catalytic decomposition of hydrocarbons which comprises reacting a mixture of methane and steam containing sulfur impurities at a temperature between about 500° C. and 900° C. in the presence of a catalyst containing the product resulting from heating a mixture of ammonium dichromate and ammonium molybdate to a temperature not substantially below 300° C.

5. A catalyst for promoting the reaction between a hydrocarbon and steam of which the catalytically active portion is about 90% chromium oxide and about 10% molybdenum oxide.

6. A process for the production of hydrogen by catalytic decomposition of a hydrocarbon gas containing sulfur impurities in amount above about 1 part in 20 million, which comprises passing said gas containing sulfur impurities at a temperature of about 500° to 900° C. together with steam in contact with a catalyst comprising chromium oxide and an oxide of molybdenum and containing substantially no nickel, iron or cobalt.

7. A process for the production of hydrogen by catalytic decomposition of a hydrocarbon gas which comprises passing said gas at a temperature of about 500° to 900° C. together with steam in contact with a catalyst comprising chromium oxide and an oxide of molybdenum and containing substantially no nickel, iron or cobalt.

FRANK PORTER.